(12) United States Patent
Thieman et al.

(10) Patent No.: US 9,592,549 B2
(45) Date of Patent: Mar. 14, 2017

(54) THERMALLY DIRECTED DIE CASTING SUITABLE FOR MAKING HERMETICALLY SEALED DISC DRIVES

(71) Applicant: T.H.T. Presses, Inc., Dayton, OH (US)

(72) Inventors: Michael Thieman, Kettering, OH (US); Richard J. Kamm, Plain City, OH (US)

(73) Assignee: T.H.T. Presses, Inc., Dayton, OH (US)

(*) Notice: Subject to any disclaimer, the term of this patent is extended or adjusted under 35 U.S.C. 154(b) by 119 days.

(21) Appl. No.: 14/508,244

(22) Filed: Oct. 7, 2014

(65) Prior Publication Data
US 2015/0108884 A1  Apr. 23, 2015

Related U.S. Application Data

(60) Provisional application No. 61/894,464, filed on Oct. 23, 2013.

(51) Int. Cl.
| | |
|---|---|
| *B22D 17/30* | (2006.01) |
| *B22D 17/20* | (2006.01) |
| *B22D 17/22* | (2006.01) |
| *B22D 17/12* | (2006.01) |
| *G11B 33/02* | (2006.01) |
| *G11B 25/04* | (2006.01) |

(52) U.S. Cl.
CPC ......... *B22D 17/2023* (2013.01); *B22D 17/12* (2013.01); *B22D 17/20* (2013.01); *B22D 17/203* (2013.01); *B22D 17/22* (2013.01); *B22D 17/2272* (2013.01); *G11B 25/043* (2013.01); *G11B 33/022* (2013.01)

(58) Field of Classification Search
None
See application file for complete search history.

(56) References Cited

U.S. PATENT DOCUMENTS

| | | |
|---|---|---|
| 3,866,666 A | 2/1975 | Wunder |
| 3,954,455 A | 5/1976 | Flemings et al. |

(Continued)

OTHER PUBLICATIONS

Office Action dated Feb. 11, 2016 pertaining to U.S. Appl. No. 14/310,098.

(Continued)

*Primary Examiner* — Adam Krupicka
(74) *Attorney, Agent, or Firm* — Dinsmore & Shohl LLP

(57) ABSTRACT

A hermetically sealed disc drive comprising at least one aluminum alloy housing component manufactured with a thermally directed die casting press subassembly is disclosed. In one embodiment, the thermally directed die casting press subassembly comprises a thermally directed funnel gate that is skewed to sample molten material from an off-center portion of the shot sleeve. Disc drive housing components can be manufactured by injecting an aluminum alloy slurry from the shot sleeve through the thermally directed funnel gate and the injection nozzle into the die cavity. The aluminum alloy slurry may be a thixotropic slurry comprising a uniform primary aluminum particle size in the range of approximately 50 to 80 microns. The primary aluminum particles of cast products produced according to the methodology of the present disclosure, with the aforementioned particle size distribution, are free of encapsulated eutectic at the micron scale.

7 Claims, 5 Drawing Sheets

(56) References Cited

U.S. PATENT DOCUMENTS

| | | |
|---|---|---|
| 4,434,837 A | 3/1984 | Winter et al. |
| 4,799,534 A | 1/1989 | Ueno et al. |
| 5,161,601 A | 11/1992 | Abis et al. |
| 5,223,996 A | 6/1993 | Reed et al. |
| 5,332,026 A | 7/1994 | Thieman et al. |
| 5,429,175 A | 7/1995 | Thieman et al. |
| 5,660,223 A | 8/1997 | Thieman et al. |
| 5,858,513 A | 1/1999 | Jessen |
| 6,078,468 A | 6/2000 | Fiske |
| 6,165,411 A | 12/2000 | Adachi et al. |
| 6,467,528 B1 | 10/2002 | Kamm et al. |
| 6,745,819 B2 | 6/2004 | Kamm et al. |
| 6,808,004 B2 | 10/2004 | Kamm et al. |
| 6,901,991 B2 | 6/2005 | Kamm et al. |
| 6,913,062 B2 | 7/2005 | Kamm et al. |
| 6,962,189 B2 | 11/2005 | Buckley |
| 7,323,069 B2 | 1/2008 | DasGupta et al. |
| 7,331,373 B2 | 2/2008 | DasGupta et al. |
| 8,451,559 B1 | 5/2013 | Berding et al. |
| 2003/0037901 A1 | 2/2003 | Kamm et al. |
| 2003/0141033 A1 | 7/2003 | Kamm et al. |
| 2003/0196775 A1 | 10/2003 | Kamm et al. |
| 2004/0094286 A1 | 5/2004 | Kamm et al. |
| 2004/0216858 A1 | 11/2004 | Kamm et al. |
| 2005/0056394 A1 | 3/2005 | Kamm et al. |
| 2005/0103461 A1 | 5/2005 | Jorstad et al. |
| 2005/0286163 A1* | 12/2005 | Kim .............. G11B 25/043 360/97.2 |
| 2007/0204968 A1 | 9/2007 | Cruse et al. |
| 2011/0097501 A1 | 4/2011 | Hollins et al. |
| 2012/0275285 A1 | 11/2012 | McGuire, Jr. |
| 2013/0088795 A1 | 4/2013 | Brown |
| 2014/0097720 A1 | 4/2014 | Thieman et al. |
| 2015/0063074 A1 | 3/2015 | Oh et al. |
| 2015/0108884 A1 | 4/2015 | Thieman et al. |

OTHER PUBLICATIONS

International Search Report and Written Opinion dated Mar. 24, 2005 pertaining to PCT/US2014/061058.

* cited by examiner

THERMALLY DIRECTED DIE CASTING SUITABLE FOR MAKING HERMETICALLY SEALED DISC DRIVES

CROSS-REFERENCE TO RELATED APPLICATIONS

This application claims the benefit of U.S. Provisional Application Ser. No. 61/894,464, filed Oct. 23, 2013.

BACKGROUND

The present disclosure relates to vertical die casting operations. Generally, in a vertical die casting press, a frame supports one or more vertical shot sleeves, and each sleeve receives a shot piston mounted on a shot piston rod connected to a hydraulic cylinder. The shot sleeve receives a molten die casting metal which is forced upwardly by the shot piston into a die cavity defined between a vertically moveable upper die member and a lower die member. The lower die member defines an opening through which the metal within the shot sleeve is forced upwardly into the die cavity to form a die cast part. After the molten metal has cooled within the die cavity, the upper die member is disengaged from the lower die member, and the lower die member can be shifted to a station where the part can be removed. The remaining solidified metal or biscuit within the shot sleeve can be removed by elevating the shot piston and pressing the biscuit laterally from the shot piston. When multiple shot sleeves are used in a press, the shot sleeves can be indexed between a metal receiving station and a metal injection or transfer station. Further details regarding the design and operation of vertical die casting presses may be gleaned from a variety of readily available sources including, for example, U.S. Pat. Nos. 3,866,666, 4,799,534, 5,332,026, 5,660,223, 6,913,062.

The present disclosure also relates to semi-solid molding (SSM) of metal alloys and the equipment and methods used for SSM, including vertical die casting presses, details of which may be readily gleaned from a variety of readily available sources including, for example, U.S. Pat. Nos. 6,901,991, 3,954,455, 4,434,837, 5,161,601 and 6,165,411. SSM is also discussed in a book entitled Science and Technology of Semi-Solid Metal Processing, published by North American Die Casting Association in October, 2001.

BRIEF SUMMARY

The ability of a casting to be leak free when pressurized by helium gas is primarily related to the casting being free of porosity. Porosity can exist on a macro scale from gas entrapment due to a turbulent metal flow during the casting process. Porosity can also exist on a micro scale due to solidification shrinkage during the casting process. In either case, a flow path can exist within a casting wall that allows the helium to leak through the casting wall.

In accordance with the teachings of the present disclosure, the presence of porosity can be essentially eliminated by proper control of the casting microstructure. More specifically, macro porosity can be eliminated by having the casting material, e.g., aluminum alloy A356, fill the mold cavity with a laminar flow. Gas within the mold cavity will not be entrained when the flow is laminar. Control of this flow behavior is directly related to the microstructure and thixotropy of the alloy. Because of the thixotropic nature of the SLC slurry and the non-turbulent way that it flows into a casting die, the process is capable of producing cast parts having thin sections, geometric complexity and close dimensional tolerances without entrapped gas porosity. Preferably, the thixotropic aluminum slurry will be characterized by a uniform primary aluminum particle size in the range of 50 to 80 microns. A uniform distribution of this microstructure throughout the injected aluminum volume encourages laminar flow of the aluminum into the die cavity.

The primary aluminum particles of cast products produced according to the methodology of the present disclosure, with the aforementioned particle size distribution, are free of encapsulated eutectic at the micron scale. Accordingly, micro porosity can be essentially eliminated in castings produced using the methodology of the present disclosure because micro porosity does not readily occur within the primary aluminum particle. This is presumed to be caused by a temperature gradient surrounding the particle that exceeds the local liquidous temperature of the alloy. The primary aluminum particle solidifies directionally to form a solidification shrink free particle. This temperature gradient is what promotes the globular geometry of the primary aluminum particle.

In addition, there is a lower shrink potential in the eutectic surrounding the primary aluminum particle due to the lower bulk energy (temperature) of the alloy. Another factor in promoting a shrink free microstructure is the proximity of neighboring primary aluminum particles. The solute boundary layer as well as the solid/liquid interface of neighboring particles interact with one another as solidification occurs. The physical proximity of the neighboring particles along with the thermal characteristics of temperature gradient surrounding the particles provides a low solidification shrinkage environment in which the eutectic solidifies.

The present disclosure recognizes that contemplated embodiments of the present disclosure are particularly well-suited for casting components for use in constructing hermetically sealed housings, including, for example, hermetically sealed housings for digital data storage. More particularly, the present applicant has recognized that contemplated embodiments of the present disclosure are particularly well-suited for casting components for use in constructing hermetically-sealed, helium-filled hard drives.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
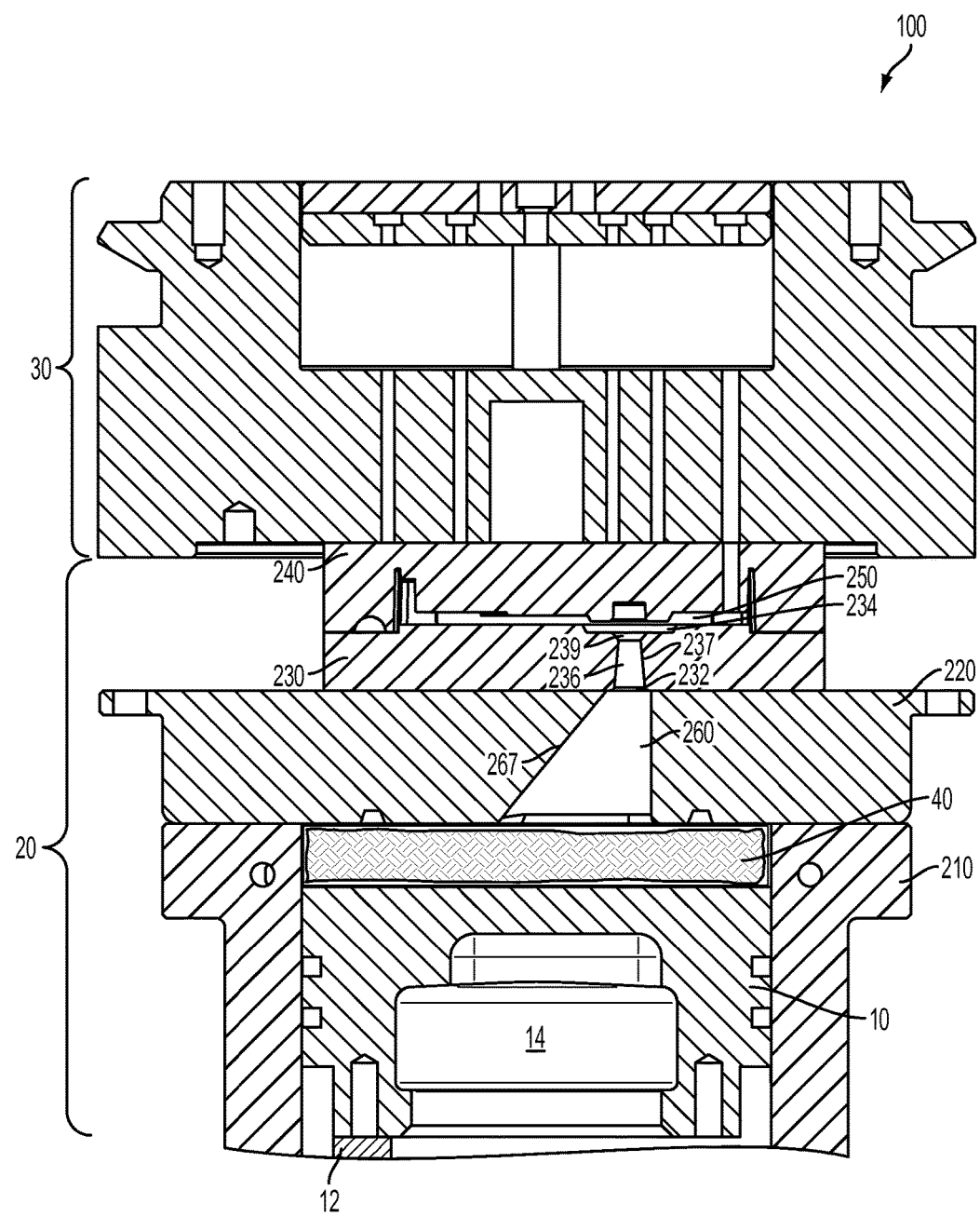
FIG. 1 is a front elevation cross-sectional view of a vertical die casting press according to one or more embodiments of the present disclosure.

One embodiment of a vertical die casting press 100 according to the present disclosure is shown in FIG. 1, and comprises a shot piston 10, a shot piston rod 12, a thermally directed press subassembly 20, and an upper mold ejection subassembly 30. The thermally directed press subassembly 20 comprises a shot sleeve 210, a gate plate 220, a lower mold plate 230, and an upper mold plate 240. The shot piston 10 is positioned within the shot sleeve 210. A hydraulic cylinder can be mechanically coupled to the shot piston rod 12, which is configured to advance the shot piston 10 mechanically through the shot sleeve 210.

The upper mold plate 240 and the lower mold plate 230 define a die cavity 250 there between. The upper mold ejection subassembly 30 engages the thermally directed press subassembly 20 along the upper mold plate 240 of the thermally directed press subassembly 20. The shot piston 10 may be provided with a water cavity 16 to enhance thermal control in the die casting press 100. It is contemplated that a variety of assemblies may be employed as alternatives to a hydraulic cylinder, shot piston 10, and shot piston rod 12 to provide pressurized molten material 40 to the thermally directed press subassembly 20. In operation, the thermally directed die casting press subassembly 20 generally receives molten material 40, transfers the molten material 40 through the gate plate 220 and the lower mold plate 230 to the die cavity 250 between the upper mold plate 240 and the lower mold plate 230.

The lower mold plate 230 comprises a gate port 232, a die port 234, and an injection nozzle 236 extending from the gate port 232 to the die port 234 across a thickness dimension of the lower mold plate 230. As used herein, a "plate" is not limited to a structure having a uniform planar surface. A plate may have variation, non-planar portions, abutments, or other additional features. In the illustrated embodiment, a major portion of the injection nozzle 236 comprises a contracting nozzle taper 237 along a laminar injection path 238 (see FIG. 2) extending towards the die port 234. It is contemplated that the injection nozzle 236 may additionally comprise an expanding a nozzle taper 239 along the laminar injection path 238 extending towards the die port 234, i.e., downstream of the contracting nozzle taper 237. As illustrated in the embodiment of FIG. 1, it is contemplated that the injection nozzle 236 can be configured such that a minor portion of the nozzle 236 comprises the expanding nozzle taper 239. In many embodiments, it is contemplated that the contracting nozzle taper 237 will be positioned between the gate port 232 and the expanding nozzle taper 239, and the expanding nozzle taper 239 will be positioned between the contracting nozzle taper 237 and the die port 234.

Figure 2A:
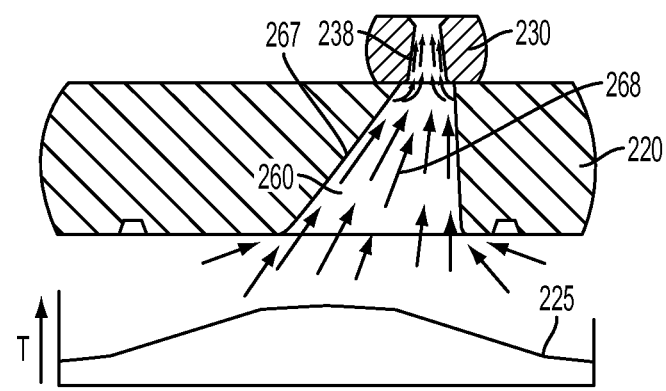
FIGS. 2A and 2B are simplified cross-sectional views of a portion of a gate plate and lower mold plate with a molten material temperature gradient profile according to alternative embodiments of the present disclosure.
Figure 2B:
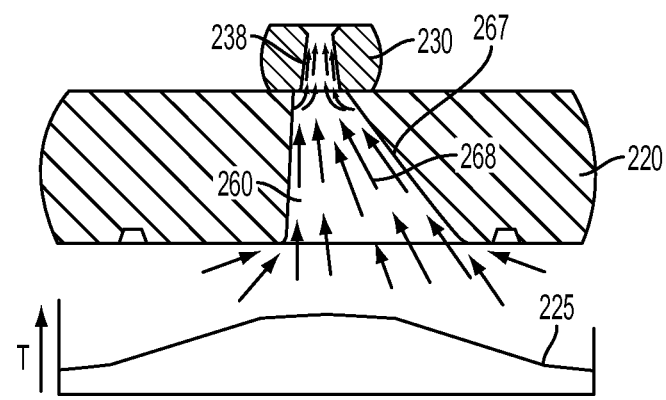
Figure 3:
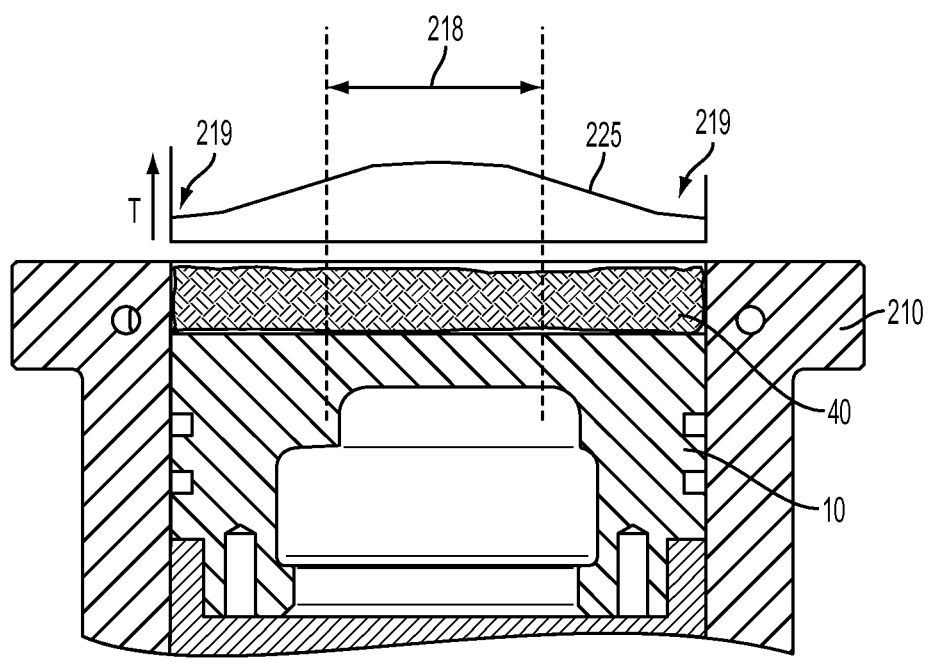
FIG. 3 is a front elevation cross-sectional view of a shot sleeve and shot piston with a representative molten material temperature gradient profile.

FIGS. 2A and 2B are simplified cross-sectional views of a portion of the gate plate 220 and lower mold plate 230 with a molten material temperature gradient profile 225 extracted from FIG. 3, which shows the molten material 40 contained within the shot sleeve 210 above the shot piston 10. The present inventors have recognized that the molten material 40 contained within the shot sleeve exhibits a significant temperature drop moving from a central region 218 of the shot sleeve 210 towards a periphery 219 of the shot sleeve 210. It is noted that the illustrated temperature gradient profile 225 is an estimation of the thermal properties of the molten material 40 contained within the shot sleeve 210 and it is contemplated that the temperature gradient of the molten material within the shot sleeve 210 may vary from that which is illustrated in FIG. 3. Accordingly, it is noted that the size of the central region 218 is presented in FIGS. 2A, 2B and 3 merely as an approximation and, as such, it is contemplated that its precise size in relation to the remainder of the shot sleeve 210 will depend upon the particular thermal characteristics of the shot sleeve 210 and the molten material 40 contained therein. For the purposes of practicing the concepts of the present disclosure it is noted that a limited amount of experimentation may be needed to determine the suitable size of the central region 218 because, as is explained in detail below, the design of the gate plate 220 should account for the size of the central region 218. More specifically, the gate plate 220 should be designed to sample molten material 40 from relatively low and relatively high temperature portions of the shot sleeve temperature gradient profile 225.

Referring to FIGS. 1 and 2, the gate plate 220 comprises a thermally directed funnel gate 260 extending from the shot sleeve 210 to the gate port 232 of the lower mold plate 230 across a thickness dimension of the gate plate 220. The gate port 232 to which the thermally directed funnel gate 260 extends may be advantageously offset relative to a central region 218 of the shot sleeve 210. The thermally directed funnel gate 260 comprises a contracting funnel taper 267 along a turbulence-inducing injection path 268 extending towards the gate port 232 of the lower mold plate 230. As is shown in the embodiment of FIG. 1, when read in light of FIGS. 4A-4D, which are described in detail below, the thermally directed funnel gate 260 may comprise a bilaterally truncated funnel, which is generally distinguishable from a circular funnel by the presence of flattened side portions in the otherwise circular cross section of a circular funnel. Examples of these flattened side portions are illustrated in FIGS. 4A-4D. It is contemplated that the funnel gate 260 may be of any shape that spans the relatively low T and relatively high T portions of the shot sleeve temperature gradient profile 225.

As shown in FIGS. 2A, 2B, and 3, the shot sleeve 210 defines a temperature gradient profile 225 rising from relatively low T portions at a periphery 219 of the shot sleeve 210 to relatively high T portions at a central region 218 of the shot sleeve. In some contemplated embodiments, the contracting funnel taper 267 of the thermally directed funnel gate 260 may be skewed to sample molten material from an off-center portion of the shot sleeve temperature gradient profile 225. More specifically, referring specifically to FIGS. 2A and 3, in some embodiments, it is contemplated that the thermally directed funnel gate 260 can be skewed such that molten material 40 sampled from relatively high T portions of the shot sleeve temperature gradient profile 225 moves towards the gate port 232 of the lower mold plate 230 at a higher velocity than molten material sampled from relatively low T portions of the shot sleeve temperature gradient profile 225. Referring to FIGS. 2B and 3, in still further contemplated embodiments, the thermally directed funnel gate 260 can be skewed such that molten material 40 sampled from relatively low T portions of the shot sleeve temperature gradient profile 225 moves towards the gate port 232 of the lower mold plate 230 at a higher velocity than molten material 40 sampled from relatively high T portions of the shot sleeve temperature gradient profile 225.

It is contemplated that the characteristics of the thermally directed funnel gate 260 may alternatively be quantified with reference to the "high temperature" and "low temperature" shot-to-port path lengths defined by the gate 260. More specifically, referring to FIGS. 2A and 3, the thermally directed funnel gate 260 is shaped such that a high temperature shot-to-port path length for molten material 40 sampled from relatively high T portions of the shot sleeve temperature gradient profile 225 is longer than a low temperature shot-to-port path length for molten material 40 sampled from relatively low T portions of the shot sleeve temperature gradient profile 225. In FIGS. 2B and 3, the thermally directed funnel gate 260 is shaped such that a low temperature shot-to-port path length for molten material 40 sampled from relatively low T portions of the shot sleeve temperature gradient profile 225 is longer than a high temperature shot-to-port path length for molten material 40 sampled from relatively high T portions of the shot sleeve temperature gradient profile 225.

FIGS. 4A, 4B, 4C, and 4D schematically depict shot sleeve footprints 212 according to selected alternative embodiments of the present disclosure. Although the illustrated shot sleeve footprints 212 are substantially circular, it is noted that the concepts of the present disclosure need not be limited to circular shot sleeve footprints 212. Rather, it is contemplated that the shot sleeve footprint 212 may take any shape allowing for a temperature gradient profile with the aforementioned relatively high and low temperature portions. For convenience, the shot sleeve footprints 212 have been presented with indicia calling out a shot sleeve center 213, a shot sleeve interior edge 215, and shot sleeve footprint radii 214. Further, as is described in detail below, the thermally directed funnel gate 260 defines a sampling footprint 211a, 211b, 211c, 211d that extends over the shot sleeve 210 along a projection that spans the relatively low T and relatively high T portions of the shot sleeve temperature gradient profile 225.

Figure 4A:
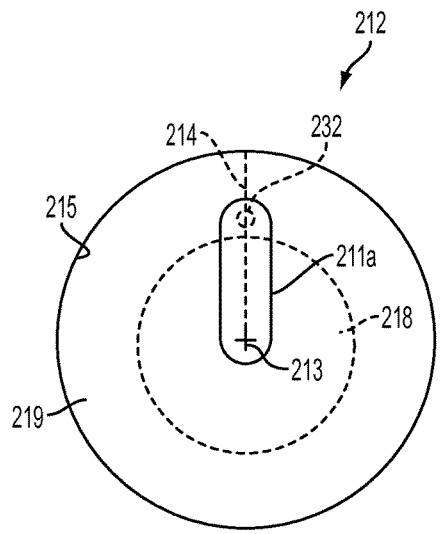
FIGS. 4A-4D schematically depict shot sleeve footprints according to selected alternative embodiments of the present disclosure.
Figure 4B:
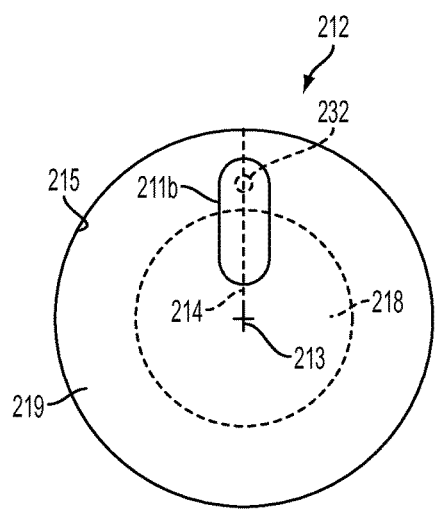

As shown in FIGS. 4A and 4B, the shot sleeve 210 may define radial sampling footprints 211a and 211b. The sampling footprints 211a and 211b have a first and second semi-circular end, each with a radius r. As shown in FIGS. 4A and 4B, the sampling footprints 211a and 211b are defined as "radial" because the major radial portion of the footprint extends along a single shot sleeve footprint radius 214. For example, it is contemplated that a sampling footprint comprising one or more minor, non-linear radial portion or other types or irregularities would still be defined as radial because it would comprise a major radial portion similar to that shown in FIGS. 4A and 4B. As shown in FIG. 4A, the radial sampling footprint 211a covers the center 213 of the central region 218 of the shot sleeve 210. Alternatively, the radial sampling footprint 211 may start with its first end on the shot sleeve footprint center 213 and extend along a shot sleeve footprint radius 214. In the alternative embodiment of FIG. 4B, the radial sampling footprint 211b is displaced from the center 213 of the central region 218 of the shot sleeve 210.

Figure 4C:
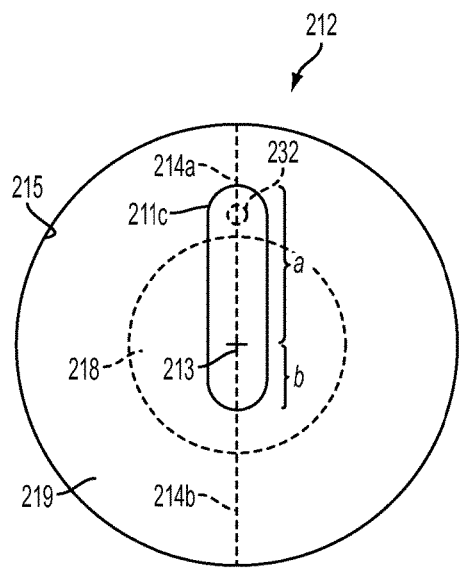
Figure 4D:
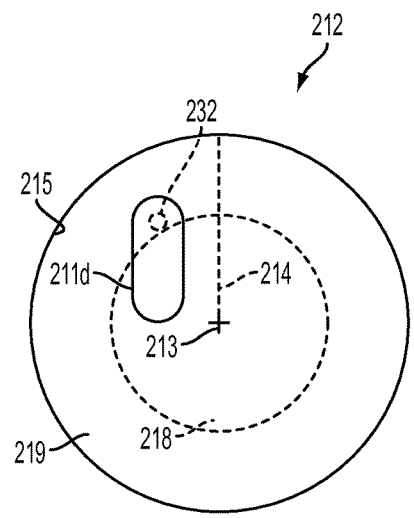

Additional alternative radial sampling footprints 211c and 211d are shown in FIGS. 4C and 4D. Referring to FIG. 4C, the contracting funnel taper 267 of the thermally directed funnel gate 260 defines a substantially diametrical sampling footprint 211c that overlies the circular shot sleeve footprint and is asymmetric with respect to the center 213 of the circular shot sleeve footprint 212. The sampling footprint 211c in FIG. 4C is defined as diametrical because it overlies the shot sleeve footprint center 213 and extends along a first shot sleeve footprint radius 214a a distance i and along a second footprint radius 214b a distance b, both of which are co-linear. For example, it is contemplated that a sampling footprint comprising one or more minor, non-linear radial portion or other types or irregularities would still be defined as diametrical because it would overlie the shot sleeve footprint center 213 and extend along two shot sleeve footprint radii 214 as shown in FIG. 4C. To ensure asymmetry, the distances a and b are not the same length. In other embodiments, the shot sleeve footprint radii 214 may be non-linear.

Referring to FIG. 4D, the contracting funnel taper 267 of the thermally directed funnel gate 460 defines a non-radial sampling footprint 211 that is displaced from a center 213 of the central region 218 of the shot sleeve 210 and extends along a projection that spans the relatively low T and relatively high T portions of the shot sleeve temperature gradient profile.

Referring collectively to FIGS. 4A-4D, it is noted that it may be advantageous to ensure that the sampling footprint 211a, 211b, 211c, 211d of the thermally directed funnel gate 260 extends to the outer boundary of a prime slurry portion of the shot sleeve footprint 212, which is defined herein as the portion of the shot sleeve footprint 212 where the temperature gradient profile 225 (see FIGS. 2A, 2B, and 3) is at least greater than the point at which primary aluminum solidification in the slurry begins, e.g., at approximately 610° C. for aluminum alloy A356. It may also be advantageous to exclude the sampling footprint 211 from extending beyond the prime slurry portion of the shot sleeve footprint 212. Typically, the sampling footprint 211 of the thermally directed funnel gate 260 will not extend to the interior edge 215 of the shot sleeve 210 because the slurry temperature there will be well below the point at which primary aluminum solidification in the slurry begins.

In some embodiments, the contracting funnel taper 267 of the thermally directed funnel gate 260 defines a sampling footprint 211 having a cross-sectional area that is a function of the die volume. For example, the cross-sectional area of the sampling footprint 211 can be selected such that the volume of the funnel gate 260 is at least approximately 40% of the volume of the die.

Figure 5:
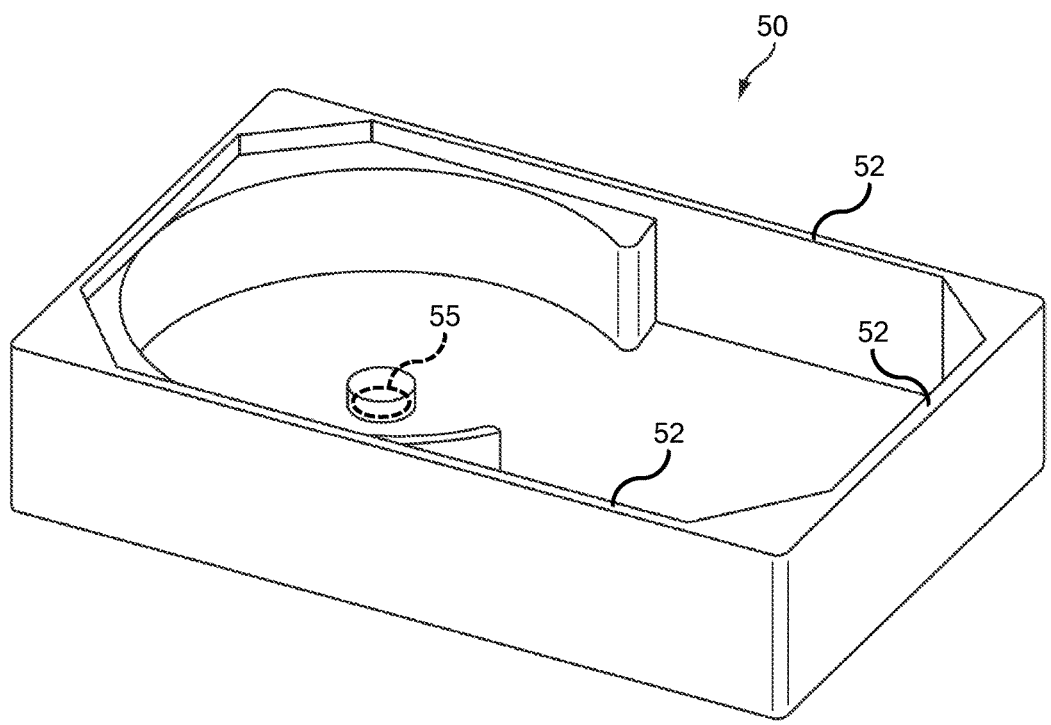
FIG. 5 illustrates a molded part according to one or more embodiments shown and described herein.

The present inventors have recognized that the concepts of the present disclosure can be used to produce parts that are well-suited for constructing hermetically sealed enclosures because the cast parts are typically substantially free of porosity that would otherwise require sealant impregnation or other means of addressing the typical porosity of cast metals. In addition, by limiting the porosity of the parts, a vertical die casting press according to the present disclosure can be used to create parts with relatively thin sections, geometric complexity, and close dimensional tolerances. For example, as shown in FIG. 5, the vertical die casting press and associated methodology disclosed herein may be utilized to produce a housing component or other molded part 50 that is suitable for use in a hermetically-sealed, helium-filled data storage drive, e.g., a hard disc drive. While the molded part 50 may be any die cast part, and may be made from a variety of materials, it is contemplated that vertical die press assemblies according to the present disclosure will be particularly advantageous in semi-solid molding (SSM) of metal alloys, as discussed above. More particularly, it is contemplated that the housing component 50 can be manufactured by injecting an aluminum alloy slurry from the shot sleeve 210 through the thermally directed funnel gate 260 and the injection nozzle 236 into the die cavity 250.

Referring further to FIG. 5, an aluminum alloy housing component 50 of a hermetically sealed disc drive will typically comprise one or more thin-walled portions 52 that, as is clearly illustrated in FIG. 5, may define the thickness dimension of the housing component wall and occupy respective majorities of many of the major faces of the housing component. The concepts of the present disclosure allow a thickness dimension of the thin-walled portions 52 to be less than approximately 2.5 mm (0.1 inches), between approximately 1.5 mm and approximately 1.75 mm (0.06 inches to 0.07 inches), or as low as 0.75 mm (0.03 inches) while preserving the above-noted hermetic properties. It is contemplated, however, that it will typically be preferable to ensure that the gating pad portion 55 of the housing component 50, which is illustrated schematically on the back side of the housing component of FIG. 5, in the area of the storage disc hub, is at least approximately 50% thicker than the aforementioned thin-walled portions 52 of the housing component 50.

It is contemplated that the vertical die casting press and associated methodology of the present disclosure limit porosity by forcing molten material to undergo turbulent and then laminar flow, while promoting-non dendritic growth via forced convection. More specifically, referring to FIGS. 1 and 3, during the injection of molten material 40 into the die cavity 250, the molten material 40 is forced through the thermally directed funnel gate 260. The gate geometry causes forced convection of hotter molten material 40 within the central region 218 with cooler molten material 40 at the periphery 219. This forced convection disperses the nuclei in the injected volume and promotes non-dendritic growth of primary molten material particles. Temperature gradients within the injected volume result in the non-dendritic or globular morphology of the primary particles. The shot piston 10 moves vertically upward to raise the surface of the molten material 40 within the thermally directed funnel gate 260 to create a turbulent flow of the molten material 40 within the thermally directed funnel gate 260. This turbulence encourages a thixotropic slurry to develop. The molten material 40 then flows through the injection nozzle 236 with a contracting nozzle taper 237. The purpose of this geometry is to promote a laminar flow of molten material 40 into the die cavity 250. This geometry reduces the turbulence in the molten material 40 that might otherwise occur within the thermally directed funnel gate 260. In this manner, it is contemplated that thin walled portions of housing components manufacture according to the teachings of the present disclosure will be characterized by helium leak rates in the ambient of less than approximately $10^{-8}$ cm$^3$/s with the helium at atmospheric pressure or above, i.e., up to approximately twice the atmospheric pressure. In many cases, it is contemplated that the aforementioned leak rate may be less than approximately $10^{-9}$ cm$^3$/s.

For the purposes of describing and defining the present invention, it is noted that "between" does not require uninterrupted succession from one component to another. For example, where the contracting nozzle taper 237 is described or recited as being positioned "between" the gate port 232 and the expanding nozzle taper 239, it is contemplated that additional tapered or non-tapered nozzle portions may be positioned between the contracting nozzle taper 237 and the gate port 232 or between the contracting nozzle taper 237 and the expanding nozzle taper 239.

It is noted that terms like "generally" and "advantageously," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," and "approximately" are utilized herein to represent the inherent degree of uncertainty that may be attributed to any quantitative comparison, value, measurement, or other representation. For example, a "substantially linear" body may refer to a body with some variation from one end to the second, with some abutments or apertures along the body, or some other minor non-linear features. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A hermetically sealed disc drive comprising at least one die cast aluminum alloy housing component wherein:
   the die cast aluminum alloy housing component comprises at least one thin-walled portion, the at least one thin-walled portion comprising primary aluminum particles;
   a thickness dimension of the at least one die cast thin-walled portion is less than approximately 2.5 mm;
   the at least one die cast thin-walled portion occupies a majority of at least one major face of the housing component; and
   a substantial entirety of the primary aluminum particles forming the die cast thin-walled portion are characterized by a uniform particle size in the range of approximately 50 to 80 microns and are free of encapsulated eutectic at the micron scale.

2. The hermetically sealed disc drive of claim 1, wherein:
   the die cast aluminum alloy housing component comprises the at least one die cast thin-walled portion and at least one die cast gating pad portion; and
   the die cast gating pad portion is at least approximately 50% thicker than the die cast thin-walled portion.

3. The hermetically sealed disc drive of claim 1 wherein:
   a thickness dimension of the at least one die cast thin-walled portion is between approximately 1.5 mm and approximately 1.75 mm (0.06 inches to 0.07 inches).

4. The hermetically sealed disc drive of claim 1 wherein:
   the die cast aluminum alloy housing component comprises the at least one die cast thin-walled portion and at least one die cast gating pad portion;
   a thickness dimension of the die cast thin-walled portion is between approximately 1.5 mm and approximately 1.75 mm (0.06 inches to 0.07 inches); and
   the die cast gating pad portion is at least approximately 50% thicker than the die cast thin-walled portion.

5. The hermetically sealed disc drive of claim 1 wherein:
the die cast thin-walled portion is characterized by helium leak rate of less than approximately $10^{-8}$ cm$^3$/s at atmospheric pressure or up to approximately twice the atmospheric pressure.

6. The hermetically sealed disc drive of claim 1 wherein:
the die cast thin-walled portion is characterized by helium leak rate of less than approximately $10^{-9}$ cm$^3$/s at atmospheric pressure or up to approximately twice the atmospheric pressure.

7. The hermetically sealed disc drive of claim 1 wherein:
the at least one die cast thin-walled portion defines an entire thickness dimension of a wall of the die cast aluminum housing component.

* * * * *